United States Patent
Azegami (10) Patent No.: US 6,437,924 B1
(45) Date of Patent: Aug. 20, 2002

(54) APPARATUS FOR PREVENTING LEAKAGE OF LIGHT IN ZOOM LENS BARREL

(75) Inventor: Kazuyoshi Azegami, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 43 days.

(21) Appl. No.: 09/711,106

(22) Filed: Nov. 14, 2000

(30) Foreign Application Priority Data

Nov. 15, 1999 (JP) .......................................... 11-323859

(51) Int. Cl.⁷ ........................ G02B 15/14; G02B 27/00; G03B 17/00
(52) U.S. Cl. ........................ 359/694; 359/601; 359/699; 359/700; 359/703; 359/704; 359/823; 396/72; 396/79; 396/80; 396/349; 396/448; 396/529
(58) Field of Search ................................. 359/693, 694, 359/698, 699, 700, 701, 703, 704, 813, 823, 822, 601, 695; 396/448, 349, 72, 79, 800, 87, 106, 529, 544

(56) References Cited

U.S. PATENT DOCUMENTS

| | | | |
|---|---|---|---|
| 4,487,482 A | 12/1984 | Itoh et al. ................ | 359/699 |
| 4,576,446 A * | 3/1986 | Kamata ...................... | 359/703 |
| 5,018,832 A * | 5/1991 | Terunuma et al. .......... | 359/601 |
| 5,191,478 A * | 3/1993 | Horoguchi et al. ......... | 359/703 |
| 5,198,932 A * | 3/1993 | Takamura .................... | 359/694 |
| 5,262,898 A * | 11/1993 | Nomura ....................... | 359/700 |
| 5,270,868 A * | 12/1993 | Nomura ....................... | 359/700 |
| 5,329,329 A * | 7/1994 | Fukushima et al. .......... | 396/72 |
| 5,365,373 A | 11/1994 | Tanaka ........................ | 359/601 |
| 5,420,656 A | 5/1995 | Kohmoto .................... | 396/448 |
| 5,450,239 A | 9/1995 | Uzie et al. .................. | 359/601 |
| 5,488,513 A | 1/1996 | Tanaka ........................ | 359/699 |
| 5,598,241 A * | 1/1997 | Nomura et al. .............. | 396/79 |
| 5,802,404 A * | 9/1998 | Nishimura .................... | 396/72 |
| 5,862,416 A * | 1/1999 | Nishimura .................... | 396/72 |
| 6,163,418 A * | 12/2000 | Okamoto .................... | 359/694 |

* cited by examiner

Primary Examiner—Loha Ben
(74) Attorney, Agent, or Firm—Greenblum & Bernstein, P.L.C.

(57) ABSTRACT

An apparatus for preventing a leakage of light in a zoom lens barrel includes a pair of cylindrical members which are relatively rotatable and relatively movable in an optical axis direction; a drive mechanism which reciprocally moves one of the cylindrical members in the optical axis direction relative to the other cylindrical member of the pair of cylindrical members when the other cylindrical member is rotated; and helical light interception projections that are provided on opposed peripheral surfaces of the pair of cylindrical members so as not to screw-engage with each other. The helical light interception projections are adapted to prevent light from entering a space between the pair of cylindrical members while permitting the pair of cylindrical members to relatively rotate and relatively move in the optical axis direction.

6 Claims, 6 Drawing Sheets

PRIOR ART

APPARATUS FOR PREVENTING LEAKAGE OF LIGHT IN ZOOM LENS BARREL

BACKGROUND OF THE INVENTION

1. Field of the Invention

The present invention relates to a zoom lens barrel of a camera and in particular, relates to an apparatus for preventing a leakage of light therefor.

2. Description of the Related Art

In a zoom lens barrel in which the focal length is varied by moving a plurality of lens groups which are relatively rotatable in the optical axis direction, various barrels (cylindrical members) are provided to perform the zooming operation. These barrels are provided with light interception devices for preventing harmful light from entering a space between the barrels.

For instance, in a lens barrel whose position is restricted by a cam mechanism, light enters a radial space between a cam ring and an inner barrel. To prevent this, it is necessary to provide a light interception member made of a rubber, separate from the barrel, at a front end of the barrel. However, since the rubber light interception member is expensive and is usually pressed onto the outer peripheral surface of the barrel which is reciprocally moved in the optical axis direction, the light interception member applies a certain load to the feed mechanism of the lens barrel, and thus, the service life of batteries may be shortened.

In a lens barrel in which the lens barrel is moved via a helicoid engagement, some of the threads of the helicoids overlap in the optical axis direction, and hence no light reaches the inner barrel portion behind the helicoids. Therefore, a light interception device is not necessary.

SUMMARY OF THE INVENTION

It is an object of the present invention to prevent light from leaking in a lens barrel whose position is restricted by a cam mechanism without using a separate or additional light interception means.

To achieve the object mentioned above, according to the present invention, an apparatus for preventing a leakage of light in a zoom lens barrel is provided, including a pair of cylindrical members which at least partly overlap in the radial direction and which are relatively rotatable and relatively movable in an optical axis direction; a drive mechanism which reciprocally moves one of the cylindrical members in the optical axis direction relative to the other cylindrical member of the pair of cylindrical members when the other cylindrical member is rotated; and helical light interception projections that are provided on opposed peripheral surfaces of the pair of cylindrical members so as not to screw-engage with each other. The helical light interception projections are adapted to prevent light from entering a space between the pair of cylindrical members while permitting the pair of cylindrical members to relatively rotate and relatively move in the optical axis direction.

In an embodiment, the pair of cylindrical members include a rotary feed cylinder and a linear movement cylinder which is arranged in the rotary feed cylinder. The drive mechanism includes a linear movement guide cylinder which is arranged in the linear movement cylinder and which is rotatable relative to the rotary feed cylinder but is not movable in the optical axis direction relative to the rotary feed cylinder, the linear movement guide cylinder being guided to linearly move in the optical axis direction; a linear movement guide slot which is formed on the linear movement guide cylinder and which extends in the optical axis direction; a cam groove which is formed between adjacent the helical light interception projections provided on the inner peripheral surface of the rotary feed cylinder; and a guided member which is secured to the linear movement cylinder, wherein the guided member engages with both the linear movement guide slot of the linear movement guide cylinder and the cam groove of the rotary feed cylinder.

Preferably, a moving lens group is further included in the linear movement guide cylinder, the moving lens group being secured to the guided member through the linear movement guide slot, so that the moving lens group is moved together with the linear movement cylinder in accordance with the axial movement of the linear movement cylinder relative to the rotary feed cylinder.

According to another aspect of the present invention, an apparatus for preventing a leakage of light between a pair of cylindrical members is provided, which at least partly overlap in the radial direction and which are relatively rotatable and relatively movable in an optical axis direction, including a drive mechanism which reciprocally moves one of the pair of cylindrical members in the optical axis direction relative to the other cylindrical member of the pair of cylindrical members when the other cylindrical member is rotated; and helical light interception projections that are provided on opposed peripheral surfaces of the pair of cylindrical members so as not to screw-engage with each other. The helical light interception projections are adapted to prevent light from entering a space between the pair of cylindrical members while permitting the pair of cylindrical members to relatively rotate and relatively move in the optical axis direction.

Preferably, the pair of cylindrical members include a rotary feed cylinder and a linear movement cylinder which is arranged in the rotary feed cylinder. The drive mechanism includes a linear movement guide cylinder which is arranged in the linear movement cylinder and which is rotatable relative to the rotary feed cylinder but is not movable in the optical axis direction relative to the rotary feed cylinder, the linear movement guide cylinder being guided to linearly move in the optical axis direction; a linear movement guide slot which is formed on the linear movement guide cylinder and which extends in the optical axis direction; a cam groove which is formed between adjacent the helical light interception projections provided on the inner peripheral surface of the rotary feed cylinder; and a guided member which is secured to the linear movement cylinder, wherein the guided member engages with both the linear movement guide slot of the linear movement guide cylinder and the cam groove of the rotary feed cylinder.

Preferably, a moving lens group is further provided in the linear movement guide cylinder, the moving lens group being secured to the guided member through the linear movement guide slot, so that the moving lens group is moved together with the linear movement cylinder in accordance with the axial movement of the linear movement cylinder relative to the rotary feed cylinder.

The present disclosure relates to subject matter contained in Japanese Patent Application No.11-323859 (filed on Nov. 15, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
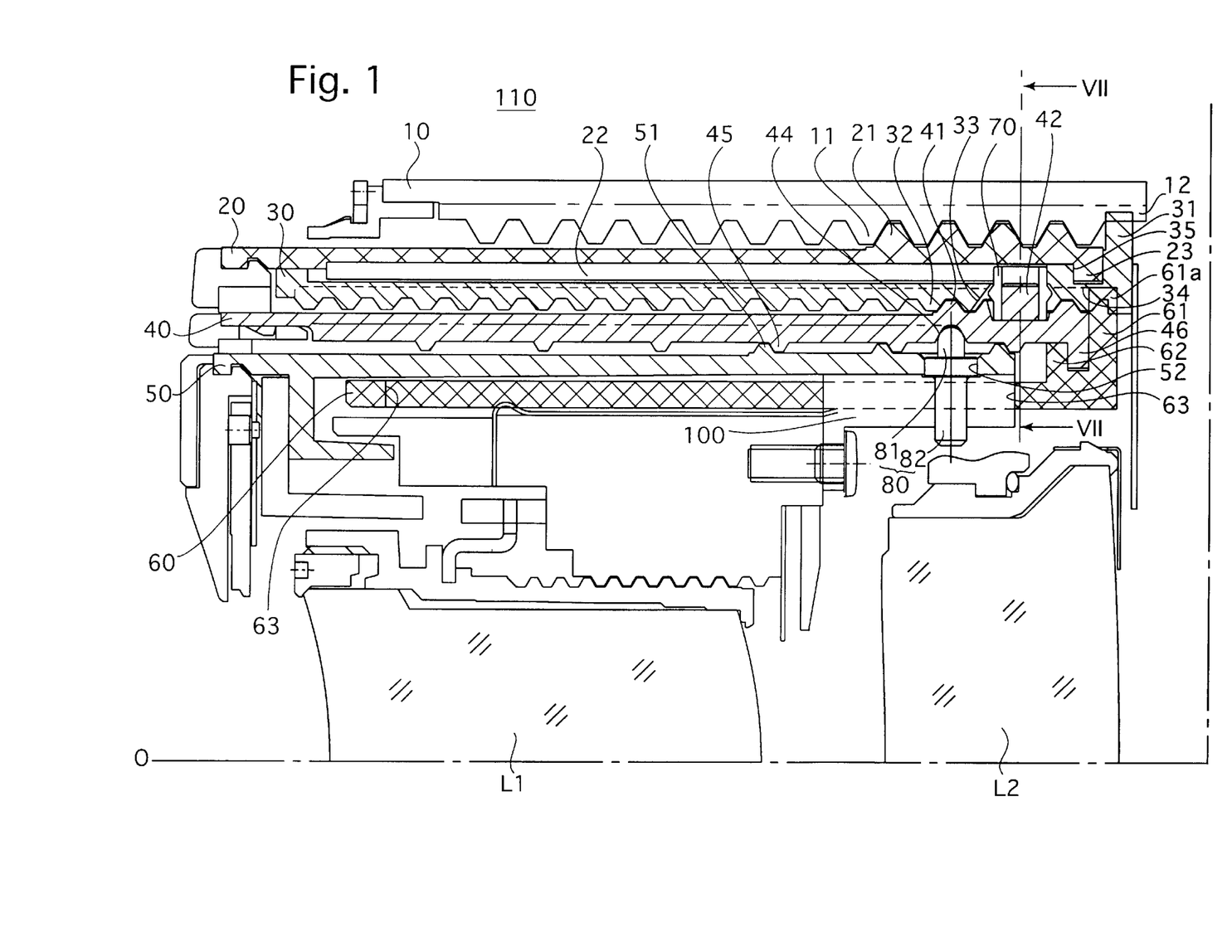
FIG. 1 is a sectional view of an upper half of a zoom lens barrel having a light leakage prevention apparatus according to the present invention.

As shown in FIG. 1, a zoom lens barrel 110 according to the present invention, is provided with two lens groups including a first lens group (front lens group) L1 and a second lens group (rear lens group) L2. The zooming operation is carried out by moving the first and second lens groups along predetermined tracks, and the focusing operation is carried out by moving the first lens group (moving lens group) L1. Note that a drive mechanism which drives the second lens group L2 is not shown in the drawings because the drive mechanism does not directly relate to the object of the present invention.

A stationary ring 10 is secured to a camera body by a known securing device. The stationary ring 10 is provided on its inner peripheral surface with a female helicoid 11 and a linear movement guide groove 12 which intersects the female helicoid 11 and extends in parallel with the optical axis O.

A male helicoid ring 20 is provided in the stationary ring 10. The male helicoid ring 20 is provided, on the outer peripheral surface of the rear end thereof, with a male helicoid 21 which engages with the female helicoid 11. The male helicoid ring 20 is provided on its inner peripheral surface with an engagement groove (bottomed groove) 22 which extends in parallel with the optical axis O. The male helicoid ring 20 is provided on its rear end with an inner flange 23 which protrudes radially and inwardly.

A linear movement ring (linear movement guide cylinder) 30 is arranged in the male helicoid ring 20. The linear movement ring 30 is provided on its rear end with an annular engagement groove 35 in which the inner flange 23 of the male helicoid ring 20 is engaged, so that the linear movement ring 30 is rotatable relative to the male helicoid ring 20 and is movable in the optical axis direction together with the male helicoid ring 20. The linear movement ring 30 is provided on its rear end with a radially and outwardly extending projection 31 which is slidably fitted in the linear movement guide groove 12 of the stationary ring 10. Consequently, the linear movement ring 30 is guided so as to linearly move in the optical axis direction and so as not to rotate relative to the stationary ring 10. The linear movement ring 30 is also provided on its inner peripheral surface with a female helicoid 32 and a helical through groove 33 extending in parallel with the female helicoid 32.

Also, a linear movement guide groove 34 which intersects the helical through groove 33 and the female helicoid 32 and which extends in parallel with the optical axis O is formed on the inner peripheral surface of the linear movement ring 30.

A cam ring (rotary feed cylinder/cylindrical member) 40 is arranged in the linear movement ring 30. The cam ring 40 is provided, on the outer peripheral surface at the rear end thereof, with a male helicoid 41 and an engagement pin (radial projection) 42 which extends in the radial and outward direction. The male helicoid 41 engages with the female helicoid 32 formed on the inner peripheral surface of the linear movement ring 30. A cylindrical roller 70 is fitted on the engagement pin 42. The engagement pin 42 and the roller 70 are slidably engaged in the engagement groove 22 of the male helicoid ring 20 via the helical through groove 33. Consequently, the cam ring 40 is restricted so as to rotate together with the male helicoid ring 20.

Figure 4:
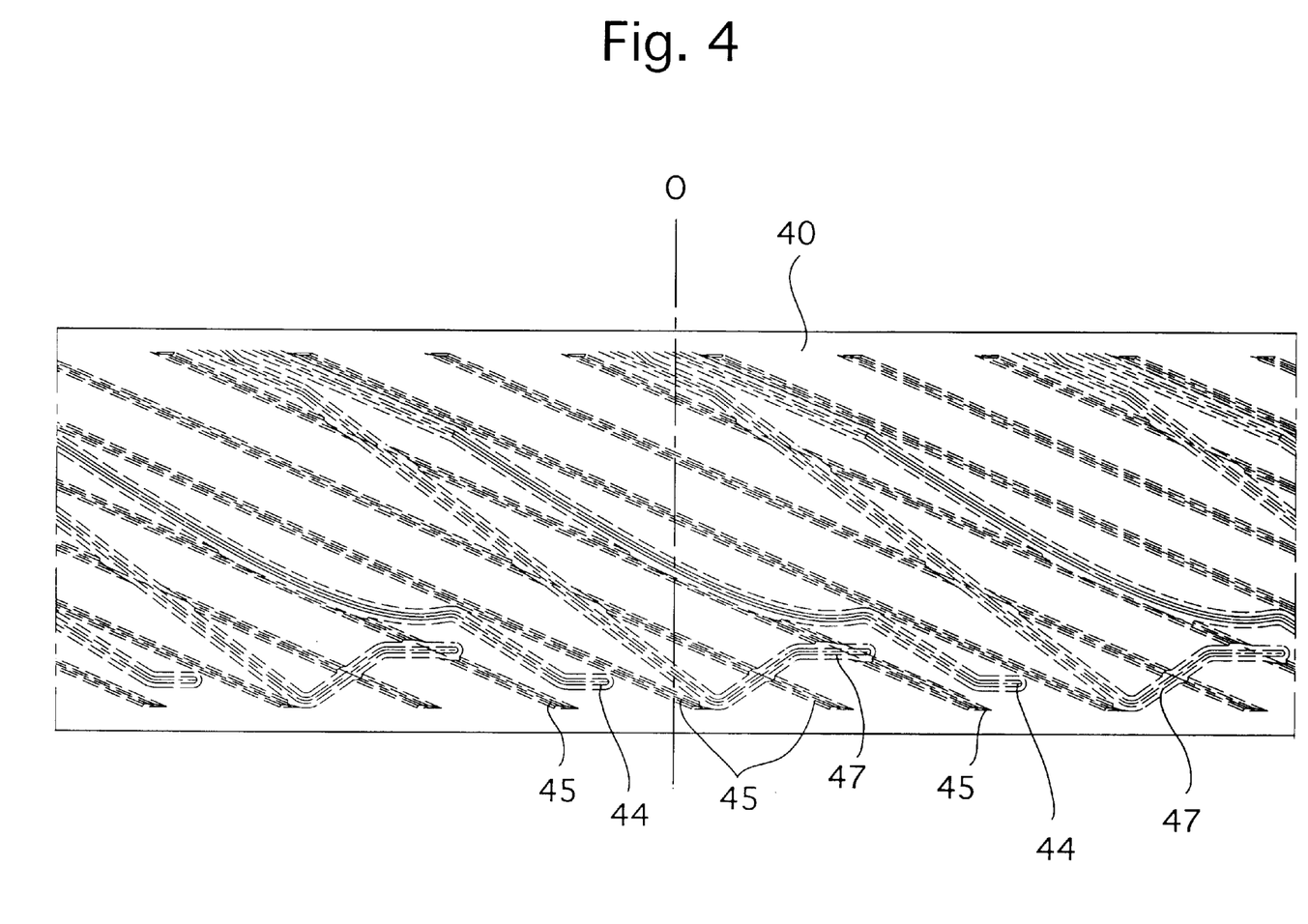
FIG. 4 is a developed view of a cam ring provided with a helical light interception projection according to the present invention.

The cam ring 40 is provided on its inner peripheral surface with an inner helical light interception projection 45 and cam grooves 44 and 47 for the first and second lens groups, respectively. FIG. 4 shows a developed view of the inner diameter portion of the cam ring 40. The cam ring 40 is provided on its rear end with an inner flange 46 which protrudes radially and inwardly.

Figure 5:
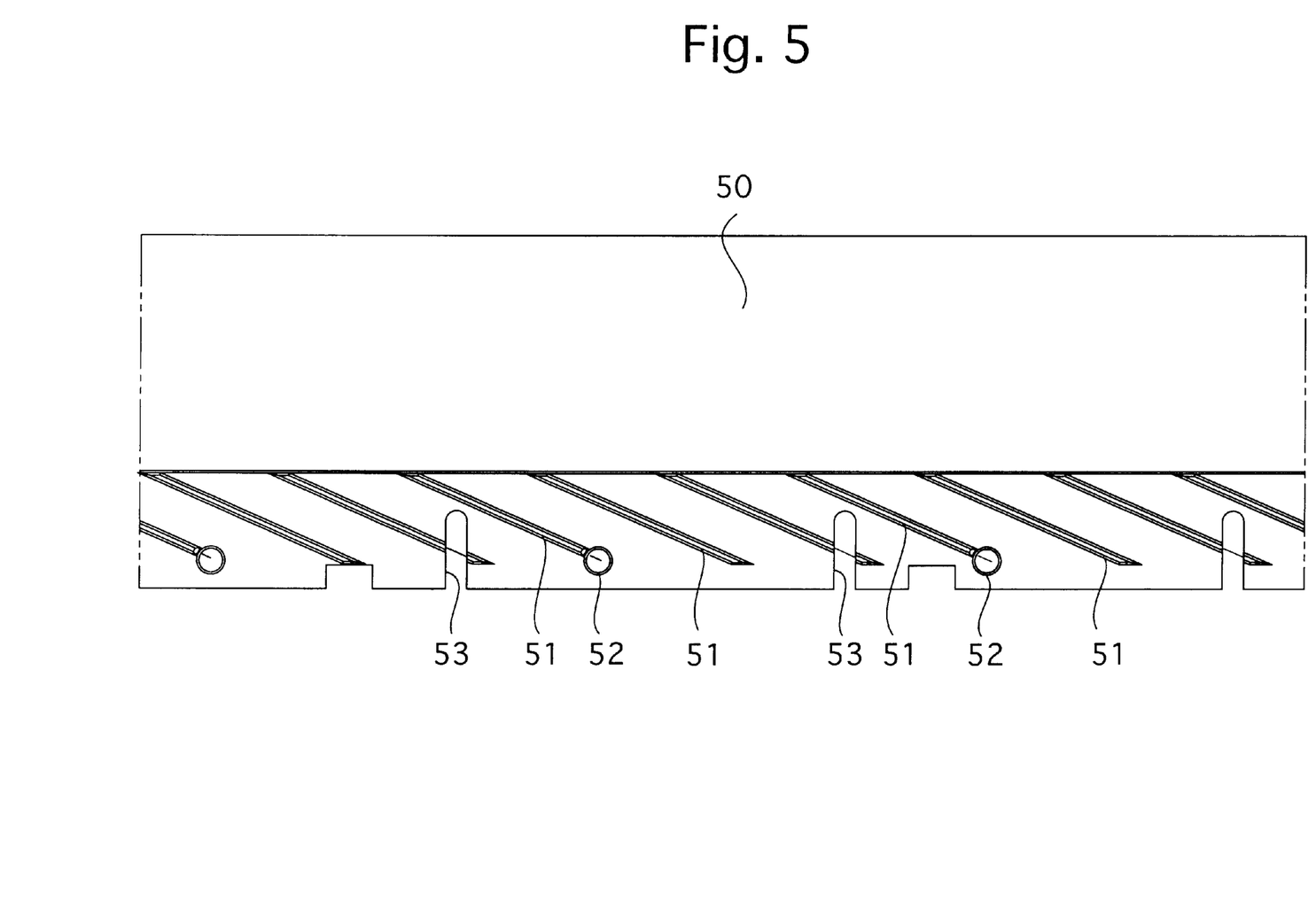
FIG. 5 is a developed view of a movable lens barrel provided with a helical light interception projection, according to the present invention.

A movable lens barrel (linear movement cylinder/cylindrical member) 50 is arranged in the cam ring 40. The movable lens barrel 50 is provided, on its outer peripheral surface of the rear end thereof, with an outer helical light interception projection 51 corresponding to the inner helical light interception projection 45. The outer and inner helical light interception projections 51 and 45 do not screw-engage with each other and do not apply any force to each other even if they are brought into contact with each other. Accordingly, light can be prevented from passing in a space defined between the barrel elements without preventing relative rotation and relative movement in the optical axis direction between the cam ring 40 and the movable lens barrel 50. FIG. 5 shows a developed view of the outer diameter portion of the movable lens barrel 50.

The movable lens barrel 50 is provided with a shaft hole 52 on an extension of the outer helical light interception projection 51, as shown in FIG. 5, so that the guide shaft 80 is secured in the shaft hole 52. The guide shaft 80 supports a first lens group holder 100 via a guide pin 82 and is provided on its outer diameter side with a cam pin 81. The first lens group holder 100 and the guide shaft 80 constitute a first guided member for the first lens group L1. The cam groove 44 for the first lens group in which the cam pin 81 is slid is formed between the ridges of the inner helical light interception projection 45 of the cam ring 40, as shown in FIG. 4. The cam groove 44 does not intersect the helical light interception projection 45 and does not extend through the wall surface of the cam ring 40. The cam ring 40 is provided with the cam grove 47 for the second lens group, which does not extend through the wall of the cam ring 40 and intersects the inner helical projection 45. The cam groove 47 can be formed by partially cutting away the inner helical light interception projection 45. Since the second lens group L2 is secured to a second guided member (not shown) which extends through the U-groove 53 and is slid in the second lens cam groove 47, one thread (ridge) of the helical light interception projection is always provided in front of the second lens group L2 in the optical axis direction, as shown in FIG. 5.

A linear movement guide ring 60 is provided in the movable lens barrel 50 so as to move together with the cam ring 40 in the optical axis direction. The linear movement guide ring 60 is provided on its rear end with a flange 61. Provided on the flange 61 is a flange projection 61a which protrudes in the radial and outward direction, and is slidably fitted in the linear movement guide groove 34 of the linear movement ring 30. Consequently, the linear movement guide ring 60 is movable in the optical axis direction but is not rotatable relative to the linear movement ring 30. The linear movement guide ring 60 is further provided with an annular projection 62 in front of the flange 61, so that the inner flange 46 is held between the flange 61 and the annular projection 62, and hence the cam ring 40 is rotatable relative to and, is axially movable together with, the linear movement guide ring 60. A linear movement guide slot 63 extending in parallel with the optical axis O is provided in front of the annular projection 62, and the first lens group holder 100 is slidably fitted in the linear movement guide slot 63. The guide pin 82 of the guide shaft 80 is secured to the first lens group holder 100. The first lens group L1 is located within the linear movement guide ring 60 and is supported by the first lens group holder 100. The linear movement guide cylinder 60, the linear movement guide slot 63, the cam groove 44, and the first guided member (first lens group holder 100 and the guide shaft 80) constitute a drive mechanism for the first lens group L1. Namely, since the cam pin 81 of the guide shaft 80 is fitted in the cam groove 44 having a predetermined profile, formed in the cam ring 40, the first lens group holder 100 is reciprocally moved in the optical axis direction via the above-mentioned drive mechanism in accordance with the reciprocal rotation of the cam ring 40.

In the zoom lens barrel 110 as constructed above, when the male helicoid ring 20 is rotated in the forward or reverse direction relative to the stationary ring 10, the male helicoid ring 20 is moved in the optical axis direction in accordance with the lead of the female helicoid 11 and the male helicoid 21 while rotating. In accordance with the movement of the male helicoid ring 20, the linear movement ring 30 which is mounted to the male helicoid ring 20 so as to rotate relative to the male helicoid ring 20 but so as not to rotate relative to the stationary ring 10 is moved in the optical axis direction without rotating. Also, the rotation of the male helicoid ring 20 causes the roller 70 (engagement pin 42) which engages with the engagement groove 22 to rotate about the optical axis, and hence the cam ring 40 is moved in the optical axis direction while rotating in accordance with the lead of the female helicoid 32 and the male helicoid 41. In accordance with the movement of the cam ring 40, the linear movement guide ring 60 which is attached to the cam ring 40 so as to rotate relative thereto but to move together therewith in the optical axis direction is moved in the optical axis direction without rotating. Since the movement of the linear movement guide ring 60 and the rotation of the cam ring 40 cause the cam pin 81 of the guide shaft 80 to move linearly in the optical axis direction in accordance with the profile of the cam groove 44 for the first lens group, the first lens group holder 100, which is guided by the linear movement guide slot 63 and secured to the guide shaft 80, is moved in the optical axis direction. Thus, the first and second lens groups L1 and L2 are moved while changing the distance therebetween to vary the focal length.

Figure 2:
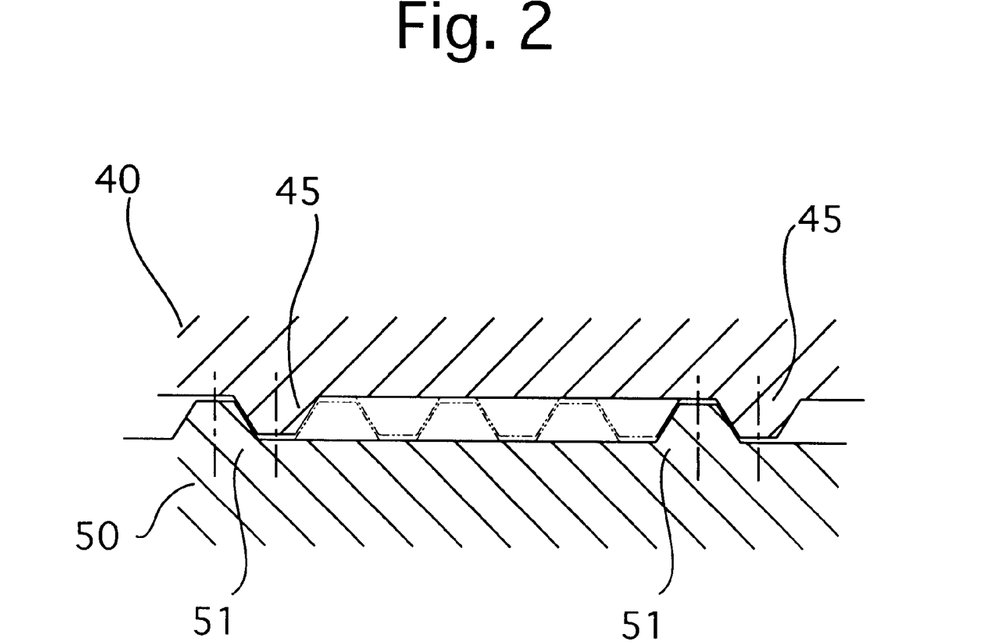
FIG. 2 is a sectional view of helical light interception projections in an abutment position, according to the present invention.
Figure 3:
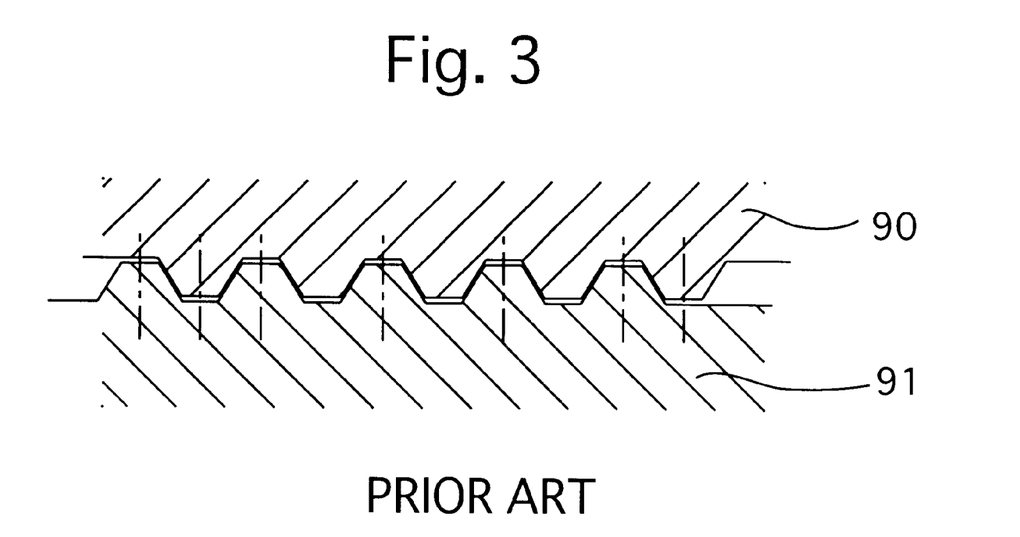
FIG. 3 is a sectional view of a known helicoid.
Figure 6:
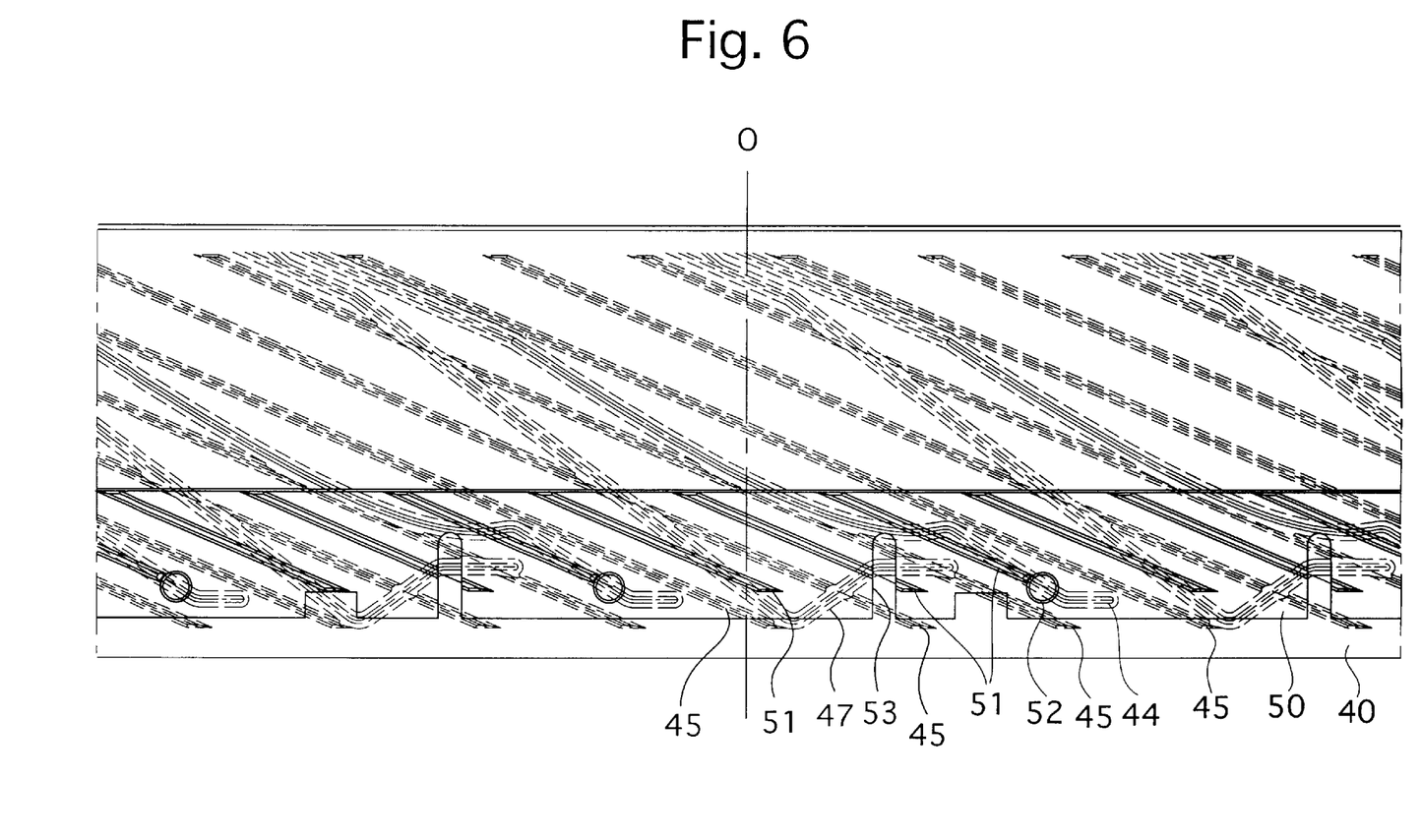
FIG. 6 is a developed view of a cam ring and a movable lens barrel shown in FIGS. 4 and 5, overlapped in an effective position.

FIG. 2 shows a sectional view of the inner helical light interception projection 45 and the outer helical light interception projection 51 which abut against the inner helical light interception projection 45, according to the present invention. The helical light interception projection is formed by cutting the threads of the helicoid of the trapezoidal section. In the illustrated embodiment, the threads of a 36-start helicoid are modified in such a way that 3 threads are cut away for every 4 threads, so that a 9-start helicoid having threads at an equal distance are obtained. Since the width of the thread grooves of the helical light interception projection is larger than the width of the threads, no screw-engagement occurs unlike a normal helicoid thread. For the sake of comparison, normal 36-start helicoids 90 and 91, in which no threads are cut-away and engage with each other, are shown in FIG. 3. FIG. 6 shows a developed view of the cam ring 40 having the helical light interception projection according to the present invention and the movable lens barrel 50 in an overlapped state. In FIG. 6, when the cam ring 40 engages with the movable lens barrel 50, and the second guided member (not shown) which extends through the U-groove 53 and supports the second lens group L2 is moved in the cam groove 47, even if the inner helical light interception projection 45 is partly made discontinuous by the intersection thereof with the second lens cam groove 47, there is always at least one thread of the helical light interception projection 51 in front of the portion wherein the cam groove 47 intersects with the light interception projection 45, in the optical axis direction.

Consequently, the cam ring 40 and the movable lens barrel 50 can be relatively moved while intercepting and preventing light from reaching the rear portions of the lens barrel with the pair of helical light interception projections 45 and 51 provided on respective opposed peripheral surfaces. Moreover, since no screw-engagement takes place unlike that of a normal thread, the cam ring 40 and the movable lens barrel 50 are relatively rotatable and movable in the optical axis direction, independently of the helical light interception projections 45 and 51.

Figure 7:
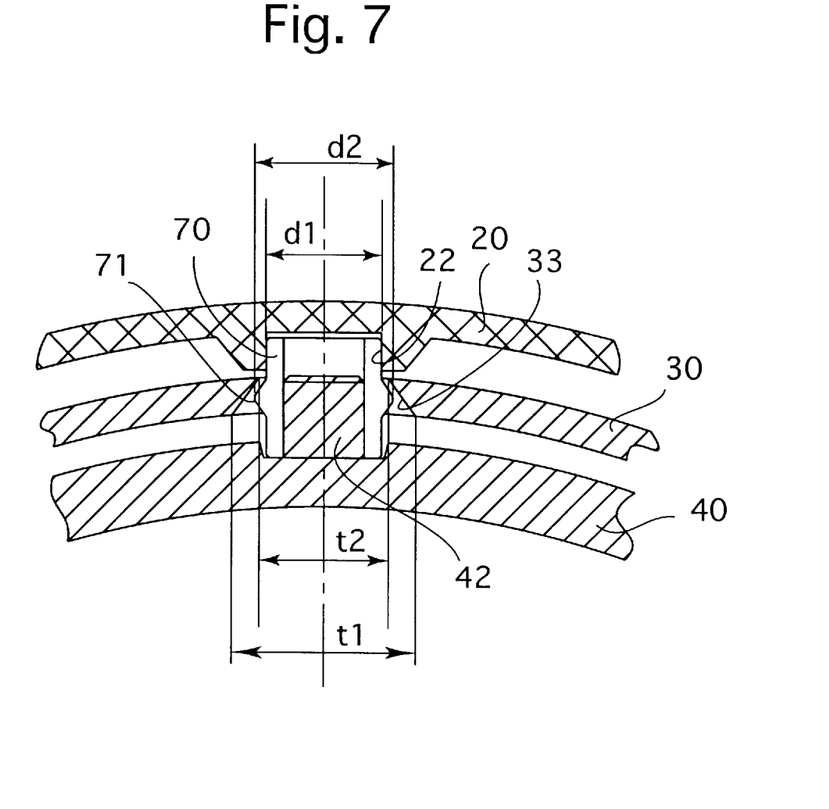
FIG. 7 is an enlarged sectional view of a lens barrel assembly taken along the line VII—VII in FIG. 1; and, FIG. 8 is an enlarged sectional view of a lens barrel assembly whose position is different from that shown in FIG. 7, and in which an engagement pin is mounted in a mounting hole.
Figure 8:
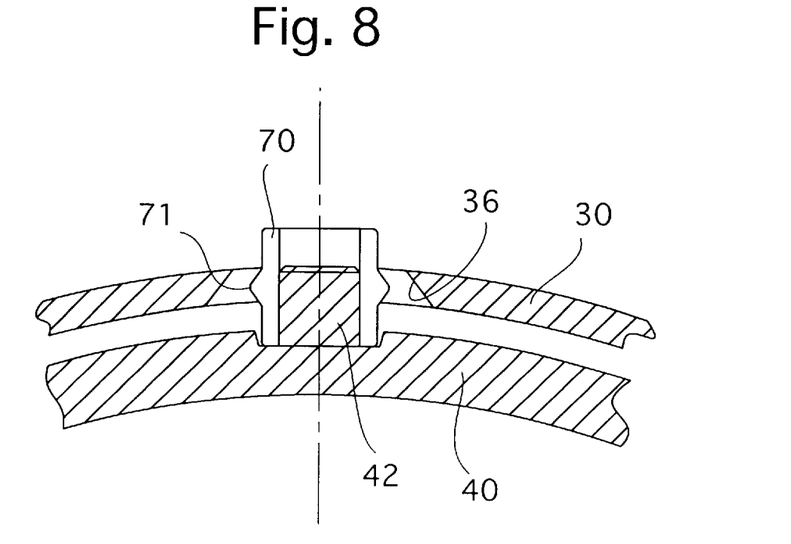

As shown in FIG. 7, the helical through groove 33 of the linear movement ring 30 has a non-rectangular sectional shape of which the open end of the groove on the inner diameter side has a width t1 which is greater than the open end width t2 on the outer diameter side thereof (t2<t1), i.e., a substantially trapezoidal sectional shape whose major side corresponds to the inner diameter side. The helical through groove 33 extends through the wall of the linear movement ring 30. The helical through groove 33 is provided with a mounting hole 36 through which the annular projection 71 can extend (FIG. 8). The roller 70 fitted on the engagement pin 42 is formed as a cylinder whose diameter is d1 and which is provided on its intermediate portion with an annular projection 71 whose diameter d2 is greater than d1 (d1<d2). When the linear movement ring 30 is attached to the cam ring 40 and the engagement pin 42 of the cam ring 40 is fitted in the mounting hole 36, it is possible to fit the roller 70 onto the engagement pin 42 from the outside of the linear movement ring 30. The width of the helical through groove 33, except the mounting hole 36, satisfies the following relationship in connection with the roller 70: d1<t2<d2<t1. Consequently, the roller 70 which is fitted on the engagement groove 42 does not slip off. Furthermore, when the roller 70 is fitted in the engagement groove 22 and the linear movement ring 30 is mounted to the male helicoid ring 20, the movement of the roller 70 is restricted by the engagement groove 22, and accordingly the roller 70 does not slip off when the roller 70 is located at the mounting hole 36.

As can be understood from the above discussion, a zoom lens barrel can be provided in which leakage of light from the front end of the barrel can be prevented without providing an additional separate light interception member between two relatively moveable cylindrical members (i.e., the cam ring 40 and the movable lens barrel 50). Since no separate light interception member is necessary, the load applied to the feed mechanism of the lens barrel can be reduced and accordingly if the invention is applied to a motor-driven zoom lens barrel, the battery consumption can be reduced. Consequently, not only can the zoom lens barrel be miniaturized but also the manufacturing cost thereof can be reduced.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An apparatus for preventing a leakage of light in a zoom lens barrel comprising:

a pair of cylindrical members which at least partly overlap in the radial direction and which are relatively rotatable and relatively movable in an optical axis direction;

a drive mechanism which reciprocally moves one of the cylindrical members in the optical axis direction relative to the other cylindrical member of said pair of cylindrical members when said other cylindrical member is rotated; and helical light interception projections that are provided on opposed peripheral surfaces of said pair of cylindrical members so as not to screw-engage with each other; wherein said helical light interception projections are adapted to prevent light from entering a space between the pair of cylindrical members while permitting said pair of cylindrical members to relatively rotate and relatively move in the optical axis direction.

2. The light leakage preventing apparatus in a zoom lens barrel according to claim 1, wherein the pair of cylindrical members comprise a rotary feed cylinder and a linear movement cylinder which is arranged in said rotary feed cylinder; and wherein said drive mechanism comprises:

a linear movement guide cylinder which is arranged in the linear movement cylinder and which is rotatable relative to the rotary feed cylinder but is not movable in the optical axis direction relative to the rotary feed cylinder, said linear movement guide cylinder being guided to linearly move in the optical axis direction;

a linear movement guide slot which is formed on the linear movement guide cylinder and which extends in the optical axis direction;

a cam groove which is formed between adjacent said helical light interception projections provided on the inner peripheral surface of the rotary feed cylinder; and a guided member which is secured to the linear movement cylinder, wherein said guided member engages with both the linear movement guide slot of the linear movement guide cylinder and the cam groove of the rotary feed cylinder.

3. The light leakage preventing apparatus in a zoom lens barrel according to claim 2, further comprising a moving lens group in the linear movement guide cylinder, said moving lens group being secured to the guided member through the linear movement guide slot, so that the moving lens group is moved together with the linear movement cylinder in accordance with the axial movement of the linear movement cylinder relative to the rotary feed cylinder.

4. An apparatus for preventing a leakage of light between a pair of cylindrical members which at least partly overlap in the radial direction and which are relatively rotatable and relatively movable in an optical axis direction, comprising:

a drive mechanism which reciprocally moves one of said pair of cylindrical members in the optical axis direction relative to the other cylindrical member of said pair of cylindrical members when said other cylindrical member is rotated; and helical light interception projections that are provided on opposed peripheral surfaces of said pair of cylindrical members so as not to screw-engage with each other; wherein said helical light interception projections are adapted to prevent light from entering a space between the pair of cylindrical members while permitting said pair of cylindrical members to relatively rotate and relatively move in the optical axis direction.

5. The light leakage preventing apparatus according to claim 4, wherein the pair of cylindrical members comprise a rotary feed cylinder and a linear movement cylinder which is arranged in the rotary feed cylinder; and wherein said drive mechanism comprises:

a linear movement guide cylinder which is arranged in the linear movement cylinder and which is rotatable relative to the rotary feed cylinder but is not movable in the optical axis direction relative to the rotary feed cylinder, said linear movement guide cylinder being guided to linearly move in the optical axis direction;

a linear movement guide slot which is formed on the linear movement guide cylinder and which extends in the optical axis direction;

a cam groove which is formed between adjacent said helical light interception projections provided on the inner peripheral surface of the rotary feed cylinder; and a guided member which is secured to the linear movement cylinder, wherein said guided member engages with both the linear movement guide slot of the linear movement guide cylinder and the cam groove of the rotary feed cylinder.

6. The light leakage preventing apparatus according to claim 5, further comprising a moving lens group in the linear movement guide cylinder, said moving lens group being secured to the guided member through the linear movement guide slot, so that the moving lens group is moved together with the linear movement cylinder in accordance with the axial movement of the linear movement cylinder relative to the rotary feed cylinder.

* * * * *